(12) United States Patent
Wojdyla et al.

(10) Patent No.: US 10,058,897 B2
(45) Date of Patent: Aug. 28, 2018

(54) METHODS AND SYSTEMS FOR PARCEL ONE PASS LABELING AND SORTING FOR PRESORT QUALIFICATION

(71) Applicant: Bell and Howell, LLC, Durham, NC (US)

(72) Inventors: Richard Wojdyla, Wadsworth, IL (US); Brian Bowers, Mundelein, IL (US); Paul Kostyniuk, Wilmette, IL (US); Walter S. Conard, Saratoga Springs, NY (US)

(73) Assignee: Fluence Automation LLC, Wheeling, IL (US)

( * ) Notice: Subject to any disclaimer, the term of this patent is extended or adjusted under 35 U.S.C. 154(b) by 0 days.

(21) Appl. No.: 15/069,165

(22) Filed: Mar. 14, 2016

(65) Prior Publication Data

US 2016/0263623 A1    Sep. 15, 2016

Related U.S. Application Data

(60) Provisional application No. 62/132,240, filed on Mar. 12, 2015.

(51) Int. Cl.
| | | |
|---|---|---|
| *B07C 3/20* | (2006.01) | |
| *G06Q 10/08* | (2012.01) | |
| *B07C 1/04* | (2006.01) | |
| *B07C 1/06* | (2006.01) | |

(52) U.S. Cl.
CPC .............. *B07C 3/20* (2013.01); *B07C 1/04* (2013.01); *B07C 1/06* (2013.01); *G06Q 10/083* (2013.01)

(58) Field of Classification Search
CPC .... B07C 1/02; B07C 1/04; B07C 1/06; B07C 1/10; B07C 1/14; B07C 1/16; B07C 3/20; G06Q 10/083

USPC .......................................................... 156/64
See application file for complete search history.

(56) References Cited

U.S. PATENT DOCUMENTS

| | | | | |
|---|---|---|---|---|
| 5,992,169 A | * | 11/1999 | Later ................... | A23B 7/0433 62/100 |
| 2005/0139323 A1 | | 6/2005 | Syde et al. | |
| 2005/0189409 A1 | * | 9/2005 | Conard ................ | B07C 3/00 235/375 |
| 2006/0231209 A1 | * | 10/2006 | Smith .................. | B65C 1/02 156/542 |
| 2009/0159508 A1 | | 6/2009 | Kostyniuk et al. | |

(Continued)

OTHER PUBLICATIONS

Extended European Search Report for Application No. 16160131 dated Jul. 5, 2016.

*Primary Examiner* — George Koch
(74) *Attorney, Agent, or Firm* — Jenkins, Wilson, Taylor & Hunt, P.A.

(57) ABSTRACT

Systems and methods for parcel one pass labeling and sorting for presort qualification. The system includes a conveyor on which parcel pieces are placed by an operator, where the conveyor ensures proper gap between parcel pieces and justifies the parcels to an edge of the conveyor in order to align the parcels with labelers which print and apply shipping documents and shipping labels. The labeled parcel pieces are then sorted according to the destination indicated and deposited into a sort bin. The system is configured to allow dynamic reassignment of the sort bins based on capacity and sort destinations processed. A single bin is used for depositing parcel pieces which do not need to be sorted by destination.

16 Claims, 10 Drawing Sheets

(56) References Cited

U.S. PATENT DOCUMENTS

2012/0097584 A1    4/2012   Neebe et al.
2012/0296467 A1   11/2012   Bowers et al.
2014/0096900 A1    4/2014   Wojdyla et al.

* cited by examiner

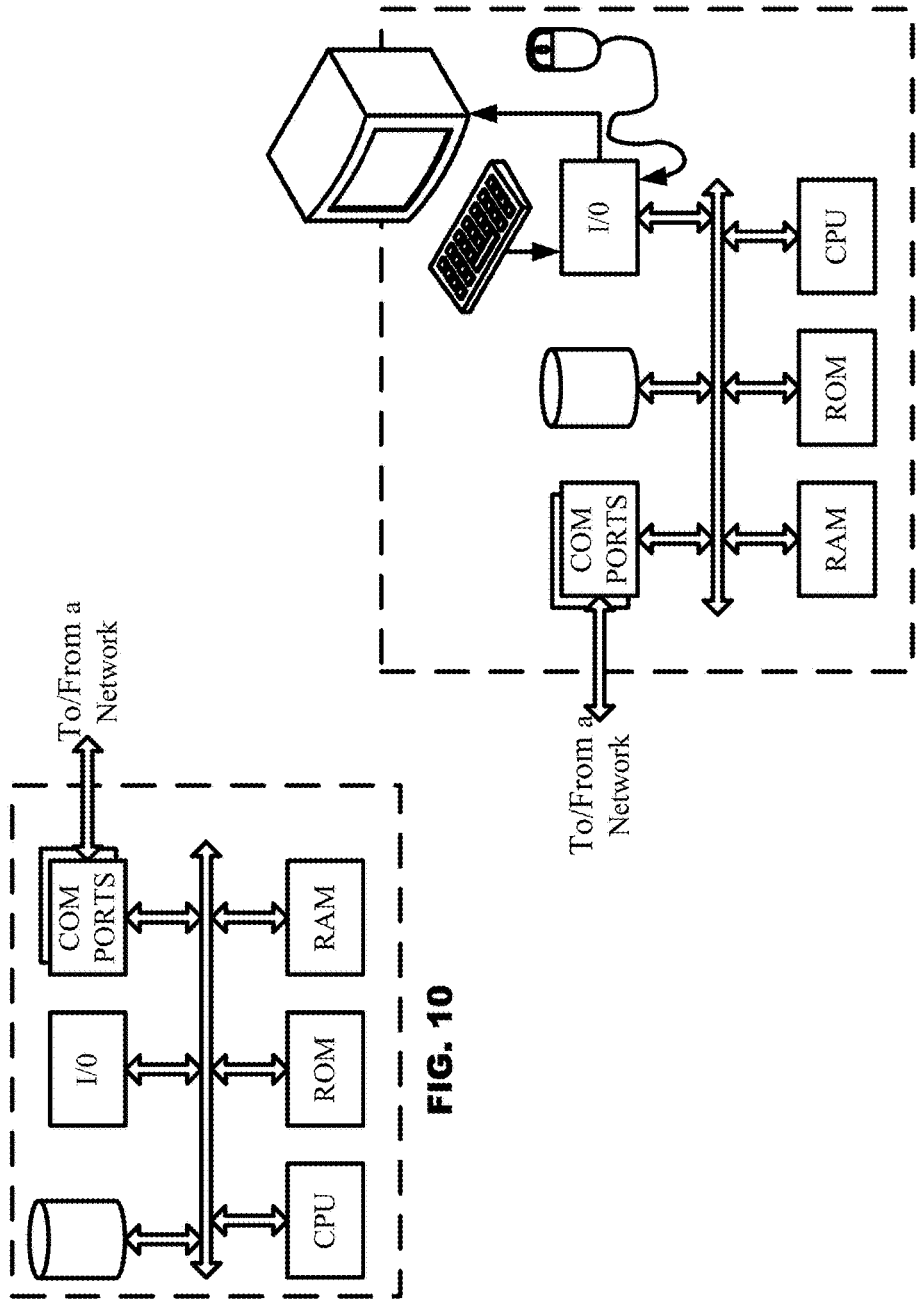

US 10,058,897 B2

METHODS AND SYSTEMS FOR PARCEL ONE PASS LABELING AND SORTING FOR PRESORT QUALIFICATION

TECHNICAL FIELD

The subject matter herein relates generally to methods and systems for labeling a product such as a parcel while moving on an input conveyer of a parcel sorter. The subject matter herein relates more particularly to methods and systems relating to a label printer, applicators to attach a shipping label to a parcel with an address printed thereon and sorting the parcel based on sort rules and the address.

BACKGROUND

Numerous enterprises ship large quantities of identical parcels to their customers. These enterprises include, but are not limited to, order fulfillment operations, online pharmacies, direct mailers, advertising groups and catalog sales. Common items included in a parcel may include product samples, order fulfillment products and reward program bonus items. These parcels need to have name and address labels applied to the parcels in a separate labeling process. The labeling process may be done on a separate labeling machine or done manually. For parcels, a separate shipping label, as defined by the delivery service, such as the United States Postal Service (USPS®), must be added to the parcel. This labeling process may be implemented on a separate labeling machine or done manually and may require an optical character recognition ("OCR") address reader to obtain the name and address date needed for the shipping label. Parcels processed using these separate labels steps will not qualify for discount postage and are shipped at a full postage rate. Alternatively, the parcels may be presorted on a Small Parcel and Bundle Sorter ("SPBS"). Presorting parcels on a SPBS requires using an OCR/barcode reader/video coding system to read names and addresses from the parcels, correcting and certifying the address data, obtaining the delivery destination ZIP code and sorting the parcels based on the ZIP code associated with the addresses. The first pass of the parcels through the sorter requires a sorter with a large number of sort bins, at least 30 bins and frequently upwards of one hundred, so that as many of the parcels can be sorted to the finest extent of sort based on a historical sort scheme. Second and third sorting passes are needed to sort all the remaining parcels to the finest extent of sort as defined in USPS® presort standards. The second and third pass sort schemes are based on the address on the parcels that were not sorted to the finest extent of sort on the first pass. The use of two or more sorting passes results in the parcels being sorted in accordance with USPS® presort rules, thereby qualifying the mailing for discount postage. The SPBS is a large machine requiring a large space for operation. If fewer sort bins are used, additional sorting passes must be added. The whole process from blank parcel to labeled and sorted to the finest extent of sort to qualify for discount postage is a labor intensive and time consuming process.

Hence, a need exists for a small sorting system that can process unaddressed parcels, apply an addressed delivery service shipping label, and sort the parcels in accordance with pre-sort processing rules to qualify for postage discounts. The labeling and sorting process occurs on a single pass of the parcel through a sorter. Application of shipping labels and packing slip labels are applied as part of the single pass sorting.

SUMMARY

Methods and systems disclosed herein process unaddressed parcels and sort the parcels in accordance with discount postage pre-sort rules. The parcels are transported on a conveyer to a labeling system that will apply shipping document labels and a delivery service shipping label. The address data is pre-processed into pre-sort groupings and then sorted into sacks or carts by the sorter stacker subsystem.

The advantages and novel features are set forth in part in the description which follows, and further embodiments of the inventive subject matter will be apparent to those skilled in the art upon examination of the following description and the accompanying drawings or may be learned by production or operation of the exemplary embodiments. Advantages of the present teachings may be realized and attained by practice or use of the methodologies, instrumentalities, and combinations thereof which are described herein.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 10 illustrates a network or host computer platform, as may typically be used to implement a server.

FIG. 11 depicts a computer with user interface elements, as may be used to implement a personal computer or other type of work station or terminal device.

DETAILED DESCRIPTION

Figure 1:
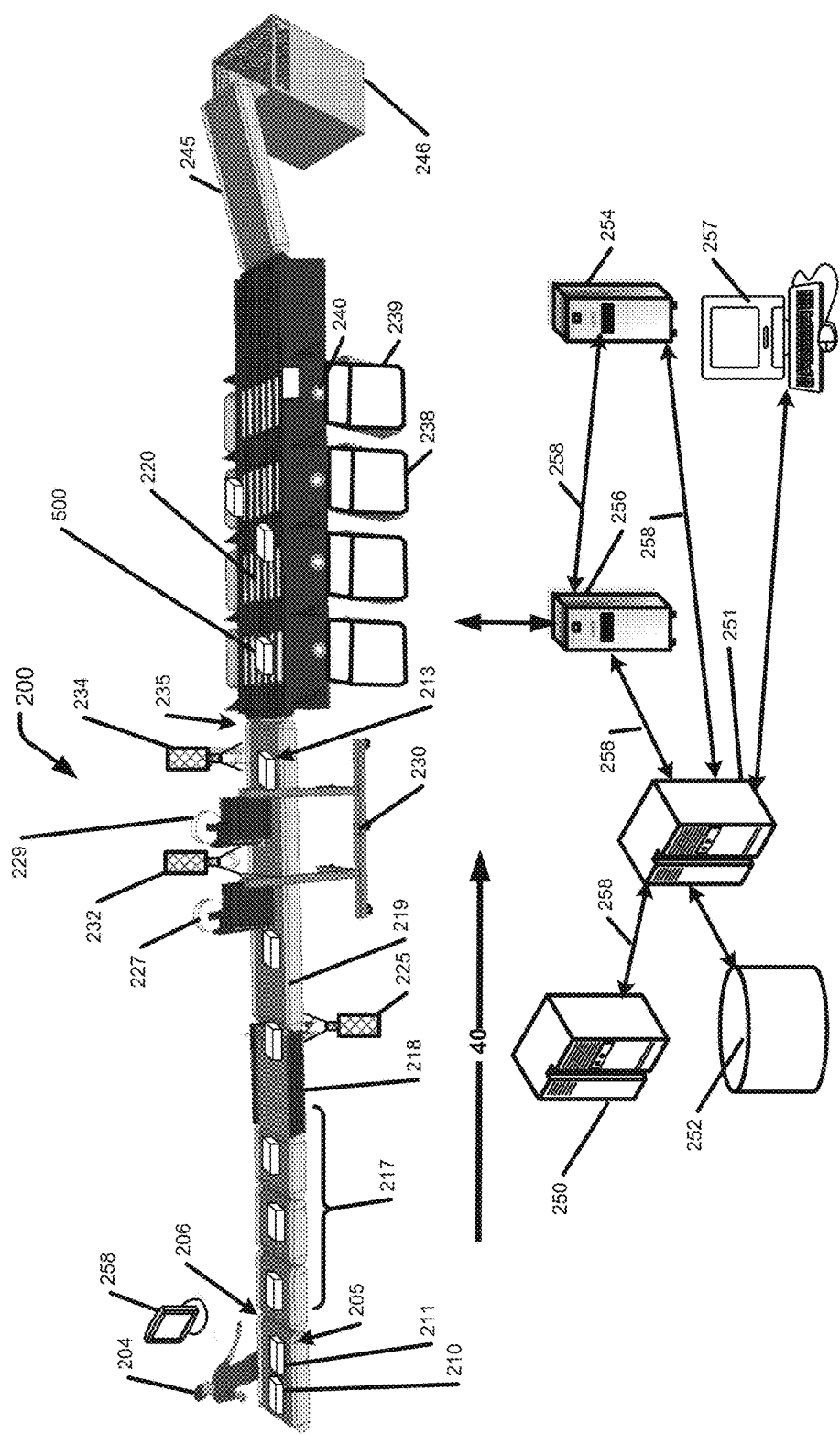
FIG. 1 is an exemplary illustration of a product sorter and labeling system.

In the following detailed description, numerous specific details are set forth by way of examples in order to provide a thorough understanding of the relevant teachings. However, it should be apparent to those skilled in the art that the present teachings may be practiced without all of such details being implemented. In other instances, well known methods, procedures, components, and circuitry have been described at a relatively high-level, without detail, in order to avoid unnecessarily obscuring novel aspects of the present teachings.

The product labeling and sorting system 200 is capable of sorting parcel pieces, such as small parcel boxes and flat size pieces (e.g., magazine, polybag, flat envelope, etc.), and then producing mailing documentation. The system comprises one or more sub-grouping of substantially identical parcel pieces configured to be sorted separately and combined into a single mailing, an address list comprising a certified address for each of the one or more sub-grouping of the substantially identical parcel pieces in a presort order, a display unit configured to display a group type indicator and a status indicator of the one or more sub-grouping of substantially identical parcel pieces configured to be sorted, one or more label applicators, each configured to apply one or more labels onto the parcel pieces of the one or more sub-grouping, and a sort scheme configured to sort the parcel pieces and deposit the parcel pieces into one of one or more sort bins. The system 200 may further include a manual feed position where one operator 204 can feed parcels or flat size pieces into the system 200. The system 200 may further comprise a conveyor configured to transport the parcel pieces of one or more sub-grouping of substantially identical parcel pieces along a direction of travel. The conveyor may comprise one or more gap control conveyor configured to ensure sufficient spacing between each parcel piece and one or more edge justifier configured to justify each parcel piece to one side of the conveyor. The system 200 may further comprise a barcode reader configured to detect a parcel identification (ID) barcode disposed on each parcel piece in the one or more sub-grouping of substantially identical parcel pieces and to verify a correct parcel is being sorted. The one or more labels may comprise one or more shipping document and/or one or more shipping label such that the one or more label applicators are configured to print and apply the one or more addressed shipping label on top of the one or more shipping document (e.g., label over label). The one or more shipping document may comprise an invoice, an advertisement coupon, an order form, and/or a return label. The one or more label applicators may be configured to dynamically print and apply one or more labels of different sizes on different parcel pieces of the one or more sub-grouping. The system 200 may further comprise one or more photo sensor 232, 234 configured to identify one or more presort destination in order to accomplish sorting of the parcel pieces in the one or more sub-grouping. The system may additional comprise an 8-bin single-tier sorter with a Narrow Belt Sorting system for Flat and FCM Parcel cycling rate up to 3,000 pieces per hour. For the non-sorting operation of Priority Mail Processing, product is transported up an inclined ramp 245 for placement in USPS Gaylord large parcel container 246 used to move parcels within or between USPS mail processing facilities.

A method for parcel one pass labeling and sorting for presort qualification is disclosed herein, the method comprising loading one or more sub-grouping of substantially identical parcel pieces configured to be sorted and combined to form a single mailing onto a conveyor, presorting an address list comprising a certified address for each of the one or more sub-groupings of the substantially identical parcel pieces in a presort order, displaying, by a display unit, a group type indicator and a status indicator of the one or more sub-grouping of substantially identical parcel pieces configured to be sorted, applying, by one or more label applicators, one or more labels onto the parcel pieces of the one or more sub-grouping, sorting, based on a sort scheme, the parcel pieces, and depositing the parcel pieces into one of one or more sort bin. According to the method disclosed above, applying one or more labels onto the parcel pieces may comprise printing and applying one or more addressed shipping label on top of one or more shipping document, wherein the one or more shipping document comprises an invoice, an advertisement coupon, an order form, and/or a return label. The step of applying one or more labels onto the parcel pieces of the one or more sub-grouping may comprise dynamically printing and applying one or more labels of different sizes on different parcel pieces. The method may further comprise detecting, by a barcode reader, a parcel identification (ID) barcode disposed on each parcel piece in the one or more sub-0grouping of substantially identical parcel pieces, and verifying a correct parcel is being sorted. The method may further comprise transporting the parcel pieces of one or more sub-grouping of substantially identical parcel pieces along a direction of travel on a conveyor, ensuring sufficient spacing between each parcel piece using one or more gap control conveyor, and justifying each parcel piece to one side of the conveyor using one or more edge justifier. The method may further comprise identifying one or more presort destination to accomplish sorting of the parcel pieces in the one or more sub-grouping.

A method for dynamic bin allocation in a one pass labeling and sorting system is further disclosed herein, the method comprising providing a one pass labeling and sorting system comprising one or more sub-grouping of substantially identical parcel pieces configured to be sorted separately and combined to form a single mailing; an address list comprising a certified address for each of the one or more sub-grouping of the substantially identical parcel pieces in a presort order; a display unit configured to display a group type indicator and a status indicator of the one or more sub-grouping of substantially identical parcel pieces configured to be sorted; one or more label applicators each configured to apply one or more labels onto the parcel pieces of the one or more sub-grouping; and a sort scheme configured to sort the parcel pieces and deposit the parcel pieces into one of one or more sort bin, and dynamically allocating, based on the sort scheme, the parcel pieces of the one or more sub-grouping to one of the one or more sort bin. The step of dynamically allocating the parcel pieces of the one or more sub-grouping to the one or more sort bin is dynamically controlled based on a number of sort bins and/or a number of overflow sort bins. The method may comprise using a single sub-grouping for dynamically allocating the parcel pieces. The method may further comprise assigning at least one sort bin of the one or more sort bin to one presort destination and sorting the parcel pieces of the one or more sub-grouping into the at least one sort bin assigned to the at least one presort destination. The at least one presort destination may comprise NDC/AFS, ADC, a three digit scheme, three digits, a five digit scheme, five digits, or any combination thereof. Dynamically allocating the parcel pieces of the one or more sub-grouping to the one or more sort bin may comprise assigning a primary and a secondary sort bin of the one or more sort bin to the at least one presort destination group, and further comprising switching between the primary and secondary sort bins after detecting, by at least one sensor, that the primary or the secondary bin is filled.

General Summary of the Parcel Sorting System

The parameters and equipment presented in the General Summary of the Parcel Sorting System section are an exemplary representation of the requirements for the product sorting and labeling system 200 as presented herein and are not to be interpreted as limitations to a skilled system designer in developing a solution that meets customer requirements.

The system 200 may have, for example, have a cycling speed of up to 3,300 pieces per hour ("pph") for flats and a throughput of up to 3,000 pph for parcels. The throughput assumes one operator 204, and depends on parcel size, weight, and operator efficiency. These cycling speeds are considered typical for the system disclosed herein. However, greater speed may be obtained using higher speed components. Those skilled in the art may make adjustments based on cost benefit trade-offs.

The exemplary system 200 may process parcel boxes of the following dimensions and weights: a length, defined as the distance measured along the transport path, from 152 mm. (6.00 in.) to 305 mm. (12.00 in.); a width, defined as the distance perpendicular to the transport path, from 127 mm. (5.00 in.) to 254 mm. (10.00 in.); a thickness, defined as the distance measured above the transport bed, from 6 mm. (0.25 in.) to 127 mm. (5.00 in.); and a weight from 2.5 oz. up to 80 oz. (5.0 lbs.). The exemplary system 200 may process flats (e.g., magazines, polybags, flat envelopes) with maximum dimensions of up to 12 in. in length, 9 in. in width, and 0.25 in. in thickness.

According to the exemplary system 200, mail is manually fed, conveyed, singulated, positioned faced up. A gapping system is used to manage the gap of products being fed and an edge justifier aligns the product to the left edge. A Bottom Barcode Reader is used to detect a QR barcode. The labeling conveyor includes 2 Signature 3000 labelers and a 6" stroke and stand, each of the Signature 3000 labelers being mounted in series to obtain a maximum 3,300 product per hour (pph) throughput (See FIG. 3). The labelers are oriented with label printed in the direction of travel. For parcel box processing, the first labeler will print the packing slip label with dimensions of 4 in.×5 in. and the second labeler will print the shipping label with dimensions of 4 in.×6 in. with a shipping label format. When processing standard flats, the first labeler will print a 4 in.×3 in. label containing the recipient address, IMb, and permit indicia2. Two SICK CLV650 verifiers are used in the exemplary system 200; Labeler 1 reads IMb barcode when processing Standard Flats Polybag Magazine and 1D barcode on packing slip; Labeler 2 reads the IMpb (Intelligent Mail parcel barcode) on shipping label applied by the Signature 3000 labeler. The system 200 includes Sorting Outputs with Sorting Software to a single-tier tub configuration, comprising an 8-position 2-way 90 degree divert, and can sort processed product into USPS sacks, trays, carts, or tubs. Processors include NET-SORT® Sorter Manager and Server Software, on a Move Comply Computer, and an Sorter Control System (SCS) (including, for example, PC, monitor, keyboard, network switch, and ergonomic mount)

Processing

The parameters and processing features presented in the Processing section are an exemplary representation of the requirements for the product sorting and labeling system 200 as presented herein and are not to be interpreted as limitations to a skilled system designer in developing a solution that meets customer requirements.

NETSORT® software processes the following exemplary rate categories: Domestic, 1$^{st}$ Class Package Service Commercial Plus; Domestic, PRIORITY MAIL® Commercial Plus Cubic; and Domestic, Standard Mail Flats. The processor receives an electronic list for a particular job from the customer and presorts the list to obtain the maximum postage discounts. The processor uses matching software for the 2D parcel ID code in the address list to determine what address is placed on the parcel and what packing slip information is placed on the parcel. USPS® manifest software is used for obtaining discounts for First Class parcels. The software determines how many of each type products are to be processed for each grouping. The parcel dimension will be provided with the list file provided by the customer. Standard flat mail processing includes bundling instructions to ensure product is bundled and sacked per USPS® mail preparation requirements.

Overview of Software Processing

The parameters and software requirements presented in the Overview of Software Processing section are an exemplary representation of the requirements for the product sorting and labeling system 200 as presented herein and are not intended as limitations to a skilled system designer in developing a solution that meets the customer requirements.

An electronic list of the particular job is provided to the product sorting system which contains address information with the associated parcel and weight of the parcels. Presorting of the address list allows for maximum discounts under the First Class Presort Parcel rules. The system provides a "Grouping Report" segmented by the number of bins available for assignment as presort destinations. The system displays which products to run for each grouping to satisfy the USPS presort qualification analysis for the group. Once a grouping is completed, the next grouping is displayed and the same process as previously mentioned is performed. Once the entire job is complete, the system generates a USPS Manifest report for Presorted First Class Parcels. Priority software may also include shipping labeling capability.

The Sorting Strategy

The sorting strategy presented in the Sorting Strategy section is an exemplary representation of the features for the product sorting and labeling system 200 as presented herein and are not to be interpreted as limitations to a skilled system designer in developing a solution that meets the customer requirements.

For First Class Parcel sorting, the address list is presorted using list processing software, then using sorting presort grouping concepts for allocating a number of bins available for assignment as presort destinations (e.g., 8 bins for the current example), displaying what products to run for the operator for that specific grouping and counting the products until the grouping is complete. The sorting of a grouping is completed by printing appropriate bag tags and calling the operator to move to the next grouping.

For Priority Parcels Cubic, all the parcels will run to the end of the sorter into a USPS wire container after the parcels are labeled.

For Standard Sorting, even though the list will be obtained in advance, the traditional multi-pass sorting scheme is applied, therefore no changes to what is already implemented to reduce risk.

The product sorting and labeling system 200 is described in relationship to the processes and equipment needed to meet the requirements of the USPS®. The system defined herein is designed to enable those skilled in the art to make modifications needed to meet the requirements of other delivery services, such as, for example, FEDEX®, UPS®, and DHL®. The products processed by the product sorting and labeling system may be, for example, light weight parcels, as defined by USPS®, flat size pieces ("flats") (e.g., magazine, polybag, flat envelope, etc.) and priority mail parcels. Other size parcels or mail pieces may also be sorted by making adjustments exemplary system described herein.

Reference now is made in detail to the examples illustrated in the accompanying drawings and discussed below. FIG. 1 illustrates the system components associated with a product sorting and labeling system 200. However, the discussion first refers to FIG. 2 to explain the problem that is solved by the product sorting and labeling system 200. Numerous enterprises have large numbers of identical parcel types (e.g., Type A, Type B, Type C, Type D, etc.) that must be delivered by a delivery service such as the USPS®. All parcel types needed for a job or sub-group sorting run are referred to as a parcel type group 410. The USPS®, for example, offers postage discounts for certain processing steps such as, for example, presorting by delivery destination and/or applying a Delivery Point barcode, such as an INTELLIGENT MAIL® barcode ("IMb") or INTELLIGENT MAIL® parcel barcode ("IMpb"), as part of the address or on the shipping label. Addresses that are used for shipping labels are move update compliant, DPV (Delivery Point Verification) validated, LACSlink compliant, and CASS (Coding Accuracy Support System) certified. The product sorting and labeling system 200 provides these services.

Figure 2:
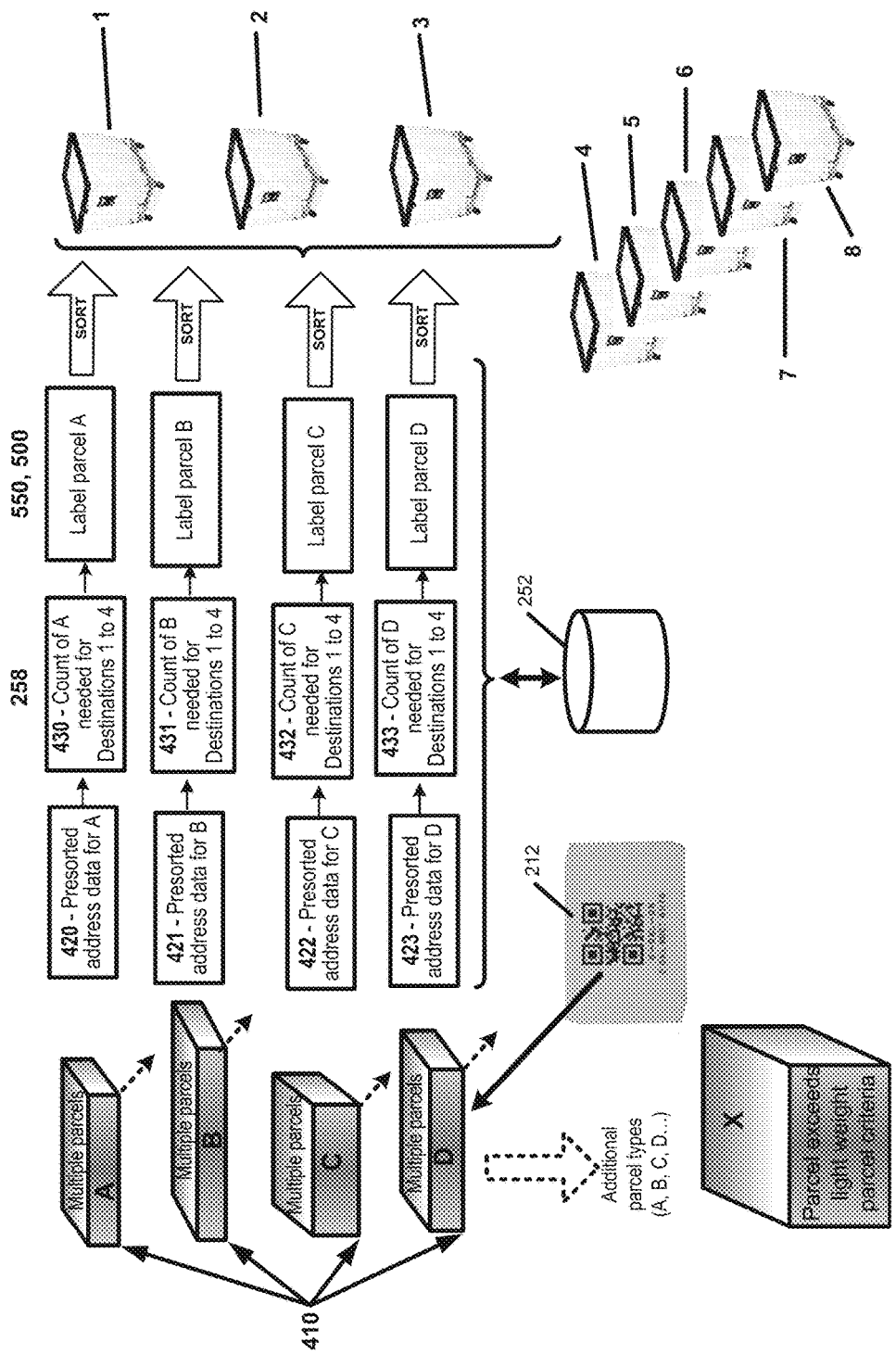
FIG. 2 is an exemplary illustration defining the product sorting and labeling process.

The parcel type groups 410 are made of a group of parcels (e.g., A, B, C, etc.) that are substantially identical in content, size and weight. Table 1 identifies the size constraints accepted for First Class Presort postage discounts. Parcels (X) that do not meet these constraints are processed as standard parcels or Priority Mail. All of the parcels that belong to a group have a parcel ID code 212, such as a QR barcode or other such suitable barcode or alpha numeric identifier, printed on the bottom of the parcel or printed on a label attached to the bottom of the parcel identifying the parcel type. Each parcel ID coded in the QR barcode 212 for a parcel type group 410 contains the same data. When the barcode is read by the barcode reader 225, an address associated with the parcel type group 410 is assigned to the parcel. In addition, a unique number may be included in the barcode data and, once read, may be added to the metadata associated with the name and address data and may be stored in the address and sort scheme database 252. The unique number can then be used to track the parcel through the processing and delivery steps and may further be used for quality control. Other uses for the unique number may be contemplated and implemented by those skilled in the art, such as in a match back process for customer relationship management (CRM) systems to know when to contact customers. The parcels do not have any address or delivery data printed or attached to the parcel. Each parcel type may include a few items or many hundreds or more of that parcel type for a given product sorting and labeling system 200 processing job. Four parcel types are illustrated in FIG. 2, but this number is not a limitation as any number of parcel types is contemplated.

Data associated with the job is received from the enterprise server 250 over a suitable network. The job data includes at least the addressee, address and parcel type or types going to that addressee for each parcel type to be delivered for each job. Other data associated with the job, such as shipping label template 500 (FIG. 6A), packing slip label template 550 (FIG. 5) is included in the data transfer.

The addresses received are CASS certified, DPV validated, and checked for move update compliance before being presorted in accordance with USPS rules for grouping destination delivery point ZIP codes. Presorting is the process by which a mailer prepares mail so it is sorted to at least the finest extent required by the USPS standards for the discount postage price claimed. Generally, presorting is performed sequentially, from the lowest (finest) level to the highest level, to those destinations specified by standard and is completed at each level before the next level of presort is prepared. Common USPS Presort groupings are Mixed NDC/ASF (all pieces addressed for delivery in the service area of the same auxiliary service facility (ASF) or network distribution center (NDC)), ADC (all pieces addressed for delivery in the service area of the same area distribution center (ADC.)), 3 digit (the ZIP Code in the delivery address on all pieces begins with the same three digits.), 3 digit scheme (the ZIP Code in the delivery address on all pieces begins with one of the 3-digit ZIP Code ranges; the 3-digit ZIP Codes in each scheme are treated as a single presort destination, subject to a single minimum volume.), 5 digit (the delivery address on all pieces includes the same 5-digit ZIP Code.) and 5 digit scheme (the ZIP Code in the delivery address on all pieces begins with one of the 5-digit ZIP Code ranges; the 5-digit ZIP Codes in each scheme are treated as a single presort destination, subject to a single minimum volume.) The order of assignment is based on assigning the groupings with the largest postage discount (5 digit) down to the lowest postage discount (mixed NDC/AFS). Achieving the finest extent of sort results in the largest postage discount for the entire sorting job (all sub-groups combined). The USPS changes the presort standards to meet delivery service standards and changing address structure.

The presort groupings are further subdivided based on the number of sort bins on the output stacker 220 (FIG. 1) section. The presort groups are allocated to the bins on the output stacker 220 section. The allocation process starts with the group that has the largest quantity of parcels for all parcel types (e.g., A, B, C, D, etc.) and ends with the presort group that has the fewest number of parcels for all parcel types in the parcel type group 410. All of the allocations require the total number of parcels allocated to a presort destination to meet the USPS minimum quantity for presort discounts. The sort bin allocation algorithm is not constrained by the allocation order described above since production operations may dictate other processing orders that achieve better production efficiency.

Based on the sort scheme bin allocations, the presorted address list is allocated by parcel type (e.g., A, B, C, D, etc.) using the ZIP code data that is associated with the parcel ID code 212. This allocation produces a presorted address list 420, 421, 422, 423 for all parcel types that are required to meet each of the presort groups that have been allocated to a bin. A group of presort destinations allocated to the sorter bins is defined as a sorting job sub-group. A count of the number of each parcel type 430, 431, 432, 433 needed to meet the sorting requirements for a sub-group is created for display 258 to the operator 204. The display 258 is used to indicate job status which includes the number of each parcel type needed for the sub-group being run and the number of each parcel type that has been successfully sorted. The display may be a standalone touch screen display 258 or a user terminal 257 for job selection sorter control.

Parcel label data and templates, required for each address and parcel type, are integrated to produce a print file for each parcel as it is processed and sorted. A packing slip label 550 (FIG. 5), and a shipping label 500 (FIG. 6A) are both applied by parcel labelers 227 and 229, respectively. Alternatively, the label print files associated with each address and parcel ID may be created before the job run and stored in an address and sort scheme database 252 with other data created by the job initialization and job run data coupled with the received customer data for the job.

An illustrative example of the allocation for the eight sort bins 238 for a sub-group is shown in FIG. 2. Bin 1 is initially a primary bin for all parcel types (e.g., A, B, C, D, etc.) addressed to a 5 digit ZIP code of 60046 (Lake Villa, Ill. Associate Post office). Bin 2 is an overflow bin for bin 1, used to prevent mis-sorts due to no bin being available during the time required to replace bin 1 when bin 1 fills completely. Accordingly, the sorting of mail to destination 1, ZIP code 60046 in this example, will alternate between bin 1 and bin 2. Similarly, bin 3 is the primary and bin 4 is overflow for the 5 digit scheme of 60050 to 60080. Bin 5 is the primary and bin 6 is the overflow for a 3 digit scheme of 600-605 (all ZIP codes belonging to one processing and Distribution Center (P&DC)). Bin 7 is for a 5 digit ZIP code of 60031 (Gurnee, Ill. Associate Post office) which may have enough parcels to qualify for a discounted rate, but not enough to fill the bin. Bin 8 may be implemented as a divert bin for any parcel that is, for example, not processed correctly, has an incorrect QR barcode or fails label print verification.

Referring to FIG. 1, an exemplary product sorting and labeling system 200 is illustrated to describe the components of the system. The operator 204 starts the sorter 200, using the touch screen display 258 or user terminal 257. Once data initialization has been completed and jobs and sub-groups are defined, the operator 204 selects parcel type A 211 from the stack of parcels staged at the input conveyor 205 and places it on the input conveyor 205 with the printed parcel ID code 212 facing downward toward the conveyor belt. Parcel 211 advances to the end of the input conveyor 205 where the parcel is detected by the parcel detect sensor 206. The direction of travel 40 for parcels is left to right, as illustrated in FIG. 1. In accordance with instructions shown on display 258, the operator 204 selects the next parcel of type A 210 or selects parcel type B if all the required parcels of type A have been input to the sorter, and places the parcel on the input conveyor 205. Three independently controlled conveyors 217 are used to create the gap between parcels that will be needed in order to print the required labels 500, 550. The gap may be controlled by varying the conveyor speed as well as the start and stop times of the gap conveyors 217. Parcel position in the conveyor may be tracked with a series of photo sensors as the parcel arrives at specific positions in the system 200. Edge justification to the side of the conveyor, where the label printer and applicators 227, 229 are located, is performed by the edge justifier 218 using angled rollers. A barcode reader 225 may be located at the exit of the edge justifier 218 and may be mounted below the conveyor to read the parcel ID code 212 to identify the parcel type. Alternatively, the parcel ID code 212 may be located on any face of the parcel 210, 211 and the barcode reader 225 may be relocated from beneath the edge justifier 218 to a position that gives a clear view of the parcel ID code 212. Based on the number of type A parcel that have been labeled and sorted successfully, the number of type A parcels on the conveyors before the output stacker 220 section, and the total number of type A parcels needed for the sub-group, the control system may be configured to determine if the correct parcel type has been detected. If the parcel type detected is wrong, the parcel of incorrect type may be routed to the divert bin 239. However if the incorrect parcel type just detected is needed for sub-group processing, the parcel can be labeled and sorted and the processing data record can be updated for the parcel type processed. After the parcel ID code 212 is read, the parcel moves onto the labeler conveyor 219.

Figure 3:
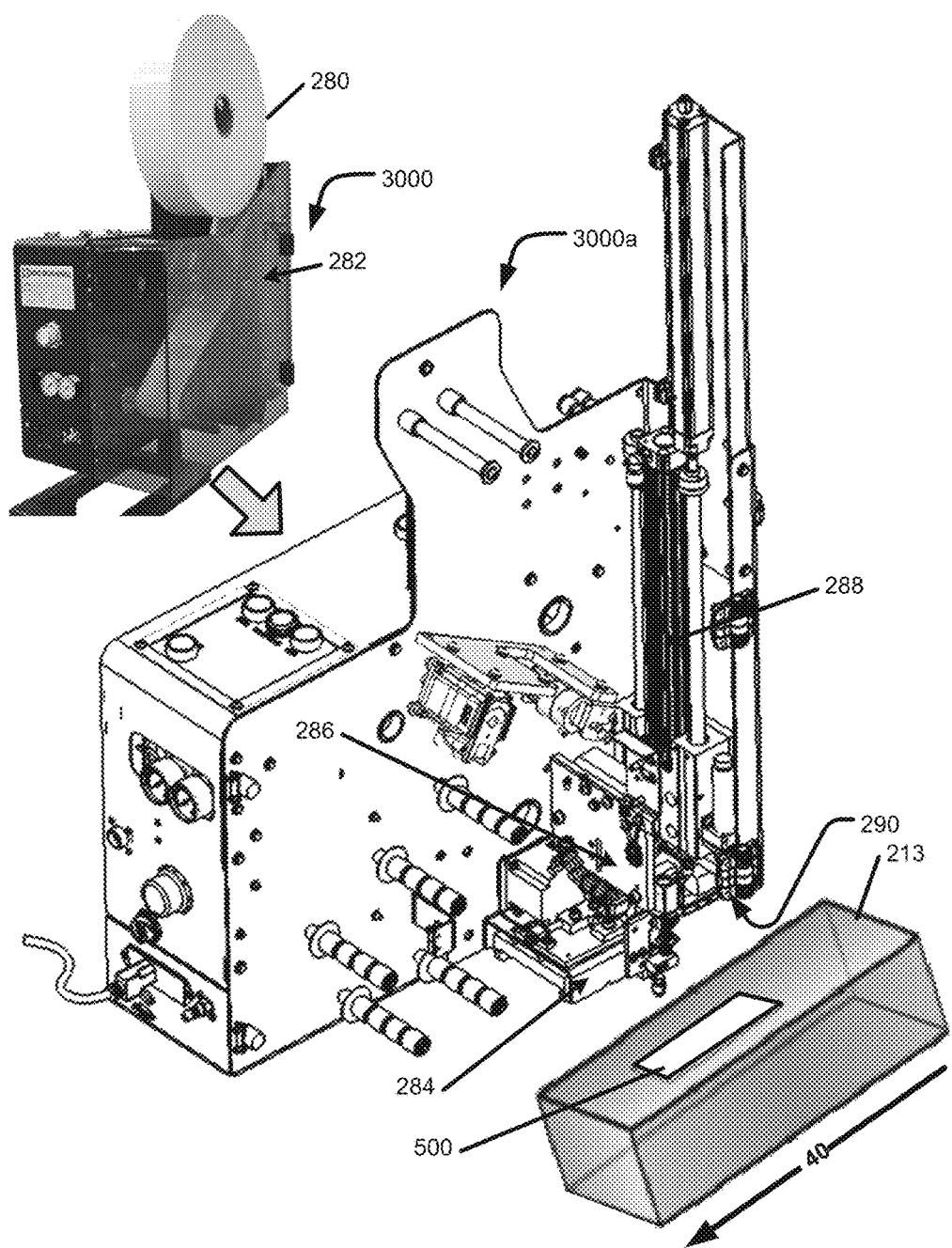
FIG. 3 is a drawing of the Signature 3000 product labeling subsystem for parcels or flat mail pieces ("flats") that are less than or equal to 5 inch thickness.

Two labelers 227, 229 may be mounted above the labeler conveyor 219 with a support structure 230. The labelers 227, 229, which may be configured to use liner-less label material (e.g., with no backing), print the completed label template, cut the label to length and apply it to the product. Alternative labelers known in the art may also be utilized. According to this embodiment, the parcels 210, 211 can vary in thickness from 0.007 inch to 5 inches. The Signature 3000 labeler 3000, manufactured by Bell and Howell, LLC, is used as an example for this application. A picture of the Signature 3000 labeler 3000 is shown in FIG. 3. The roll of linerless label material 280 is shown mounted to the labeler 3000 and the plastic side cover 282 is in the closed position. The line drawing of the labeler 3000a shows the labeler with the side cover 282 and the label material 280 removed. The location of the printer assembly 284, cutter assembly 286 and label applicator 290 are shown. The label applicator 290 is shown in the top position where the printed and cut label is attached to the applicator head. A pneumatic actuator 288 is used to lower the applicator 290 to apply the label 500 to the parcel 213. The distance the applicator must be lowered to apply the label 500 is provided from the stored data which includes the physical characteristics of the parcel type (e.g., A, B, C, D, etc.). The direction of travel of the parcel relative to the labeler 3000a is shown by arrow 40. The length of the applied label 500 can be dynamically changed for each label 500 depending on the label template requirements. Alternatively, the alignment for the labelers 227 and 229, relative to the conveyor 219 and parcel 213, may be rotated in 90 degree increments to accommodate placing the label 236 crossways on the parcel 210, 211 and having the top of the label either leading or trailing with respect to the direction of travel 40. Further detail for dynamic label size labeling can be found in U.S. Pat. No. 7,987,141, which is herein incorporated by reference in its entirety.

Figure 4:
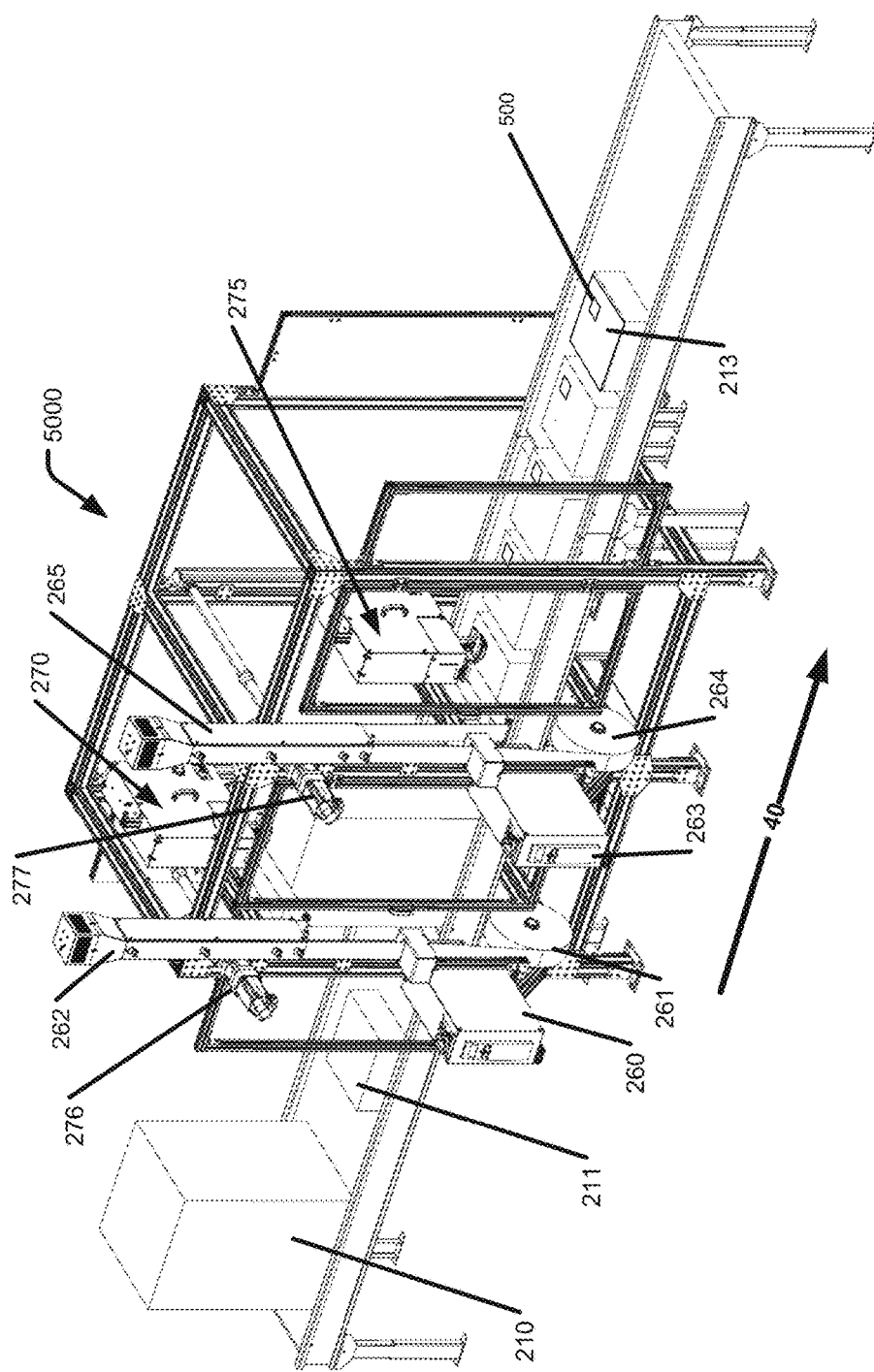
FIG. 4 is an exemplary drawing of the Signature 5000 product labeling system for parcels with greater than 5 inch thickness.

If the parcels to be labeled exceed 5 inches in thickness from item to item within a batch, the Signature 5000 labeling system, manufactured by Bell and Howell, LLC, is used. The Signature 5000 labeling system is shown in FIG. 4. Further details on the Signature 5000 can be found in US Patent Publication 2014/0096900, which is herein incorporated by reference in its entirety. Parcels 210, 211 are shown entering the labeling system 5000. Parcel 210 is significantly thicker than parcel 211 and could not be labeled by the Signature 3000 labeler. The dual labeler configuration is used to apply the shipping label 500 (FIG. 6A) to alternate parcels with the first and second label printer cutter applicators 270 and 275, respectively, for better throughput. The product sorting and labeling system 200 will apply the packing slip label 550 (FIG. 5) with label printer cutter applicator 270 and will apply the shipping label 500 (FIG. 6A) with label printer cutter applicator 275. At the output of the dual labeler system 5000, parcel 213 has two labels applied with the shipping label 500 on top. The packing slip label 550 is applied first and the shipping label 500 is applied over the packing slip label 550. The major components if the dual labelers 5000 are the label rolls 261, 264, the controllers 260, 263, the label material take up vacuum towers 262, 265, and the printer cutter applicators 270, 275. Parcel direction of travel is illustrated by arrow 40. Alternatively, the label printer cutter applicators 270, 275 and their accompanying verifiers 232, 234 may be mounted on a single height adjustment apparatus instead of the two repositioning systems 276, 277 shown in FIG. 4.

Figure 5:
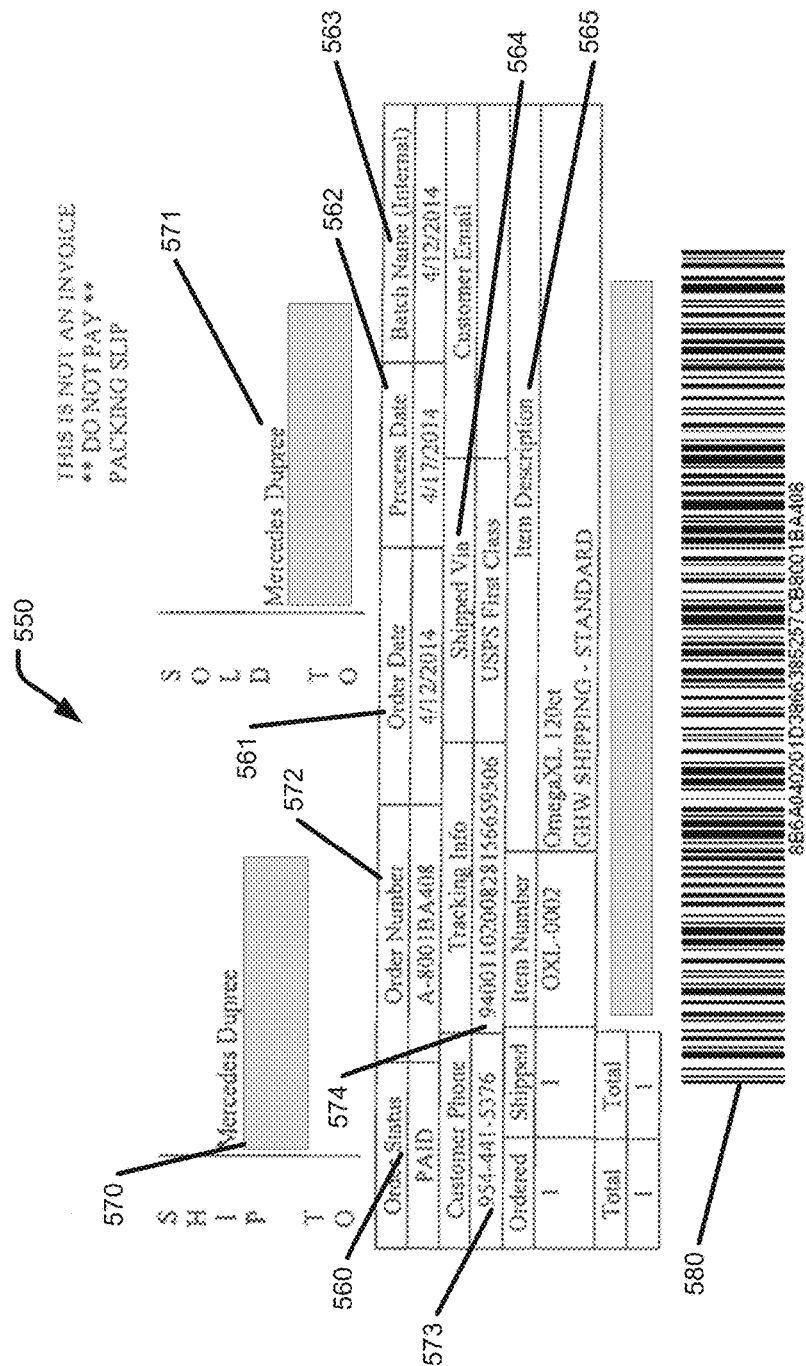
FIG. 5 is an exemplary packing slip label.

Both labeling systems 227, 229 use liner-less label material that does not have a backing material (i.e. liner attached to the label material) which is required to prevent the glue from sticking the layers of the roll together. Instead of using a liner to keep the layers of the roll from sticking together, the liner-less label glue is specially designed to have a weak adherence to the label material in the roll. In addition, the label can be removed from paper without damage within 7 to 10 days. The nature of the adhesive allows for an additional option to apply multiple shipping document labels with the first labeler 227. A packing slip label 550, such as shown in FIG. 5, is applied by labeler 227 in this disclosure but other alternatives as known in the art may be utilized based on customer requirements. Due to the nature of the adhesive, multiple labels may be stacked on top of each other. Numerous additional sub-labels can be utilized and designed by those skilled in the art, such as, for example, an invoice, packing slip 550, return shipping label, advertisement or coupon. For the case of multiple label application, the conveyor systems 205, 217, 218, 219 may have to be stopped while each additional label is printed, cut and applied. The output stacker 220 section may continue to run during this stop period. For normal operation, where labeler 1 (227) applies a packing slip 550 and labeler 2 (229) applies a shipping label 500, the conveyors are not stopped.

FIG. 5 shows an example of a packing slip label 550 template. Numerous general data items can be filled in before the job run (for example items 560, 561, 562, 563, 564 and 565) since they are not dependent on the customer or address data. Other items may be customer dependent and will be unique to the customer name and address, such as ship to name and address 570, sold to name and address 571, order number 572, phone number 573 and tracking info 574. Variable data items may be linked for retrieval by the addressee, address and QR ID code, for the parcel to be labeled, to the address and sort scheme database 252. A packing slip barcode 580 may be printed on each packing slip and may contain both unique data and general data as defined by the job requirements. Numerous other template configurations are possible for the variety of labels that can be printed and applied by the shipping documentation labeler 227. Following the labeler 227 may be a verifier 232 used to ensure that the correct label was applied. Verification may be performed by reading the packing slip barcode 580 and comparing the data read with the data record for the parcel just labeled. Alternatively, key fields in the packing slip label 550 can be read by an OCR verifier system and compared to the data record. If the verification fails the parcel will be sent to the divert bin 239. A diverted parcel will not be counted as processed and the address will be marked for reuse.

If the packing slip label 550 is correct, a shipping label 500 (FIG. 6A), will be applied by the second labeler 229. By enabling the dynamic label size feature of the second labeler 229, the shipping label may be longer than the largest packing slip label 550 or other label (e.g., return shipping label, advertisement, coupon, etc.). The placement of the label over the existing labels can be adjusted so that the label overlaps both the leading edge and trailing edge. This feature adds physical integrity to the stack of labels during shipping. A shipping label verifier 234 is located at the output of the second labeler 229. Verification may be performed by reading the shipping label barcode 505 (FIG. 6A) and comparing the data read with the data record for the parcel just labeled. Alternatively, key data fields in the shipping label 500, such as the name and address 510 data, can be read by an OCR verifier system and compared to the data record. If the verification fails the parcel will be sent to the divert bin 239 and the parcel will not be counted as processed and the address will be marked for reuse. Postage indicium 515 such as a permit mark or postage meter mark can be printed on the shipping label. Additional barcodes and indicium 520 may be added to the shipping label 500 as desired for tracking, postage IBI, and shipping options. These additional data items are added to the name and address metadata and stored in the address and sort scheme database 252. Since the parcel weight and dimensions are known from the data record for the parcel and the postage discount for the Presort level achieved, the correct postage can be applied to or accounted for every parcel.

When the parcel triggers the stacker sensor 235, the output stacker 220 section will place the parcel in one of the eight bins 238 available based on the sort scheme defined above. The sort bins 238 are single tier, having 8-positions with 2-way 90 degree divert, and can accommodate suitable USPS® transport containers such as, for example, trays, carts, sacks and/or tubs. Labeled parcels 213 are recorded in the address and sort scheme database 252 and on the display 258 as labeled correctly and presorted correctly when they are detected by the stacker sensor 235. Alternatively, each output stacker 220 section may have an item present sensor that is used to verify correct sorting.

In order to prevent miss-sorts when a bin is full, a pair of bins is allocated in the sort scheme (primary and overflow). Switching between primary and overflow bins is triggered by a bin full sensor 240, such as a proximity sensor. Alternatively, the dimensions and weight from the data record of every sorted parcel may be used to estimate when the sort bins 238 are full and initiate a switchover between bins. An alternative to the dedicated overflow bin is to have an overflow bin dynamically allocated during processing. As an example, when bin 1 fills, the sort controller identifies the bin location of the overflow container and assigns that destination (e.g., 60046) to that bin number. According to this example, as soon as the full container in bin 1 is removed and an empty container installed, bin 1 may become the overflow container. As a result, as the overflow bin is reassigned the destination bin assignments may also change. The changes may be dynamically updated in the sort scheme. In the event no bin is available during the processing of a parcel, the parcel may be routed to the divert bin 239. This approach yields more efficient bin utilization with a slight increase in diverts.

Additional dynamic allocation processes may be used as part of the bin allocation process. Initially, subgroups may be allocated based on the number of bins along with a certain number of over flow bins. Alternatively, a single subgroup for the entire mailing may be used for dynamic bin allocation. In this example, the parcels are sorted into a particular bin that is assigned a ZIP code or set of ZIP codes. As a ZIP code bin destination is satisfied by the parcel type groups 410, the bin becomes available for assignment of another destination ZIP code after the operator has cleared or replaced the bin. This process may be repeated until all the destination ZIP codes and parcels in the mailing have been processed.

The data processing components include a list processor server 251 to perform the initialization process of receiving the job data from the enterprise server 250, performing CASS and DPV address processing, integrating move update compliance by providing forwarding address data and arranging the address data into a presort order. Breaking the address list up by parcel type and creation of sub-groups and sort schemes may also be performed in the list processor server 251. Move update compliance may be performed in a separate computer 254 due to the large databases and the processing load associated with move update. Run time sorter and labeler control is performed by a sorter control system (SCS) computer 256, configured for real time control. A central address and sort scheme database 252, or distributed data structure, may be used. In either structure, the data needed to perform a function may be accessed over the computer network. The computer and server architecture illustrated in FIG. 1 is exemplary in nature and may be reconfigured by those skilled in the art as required.

Figures 6A, 6B:
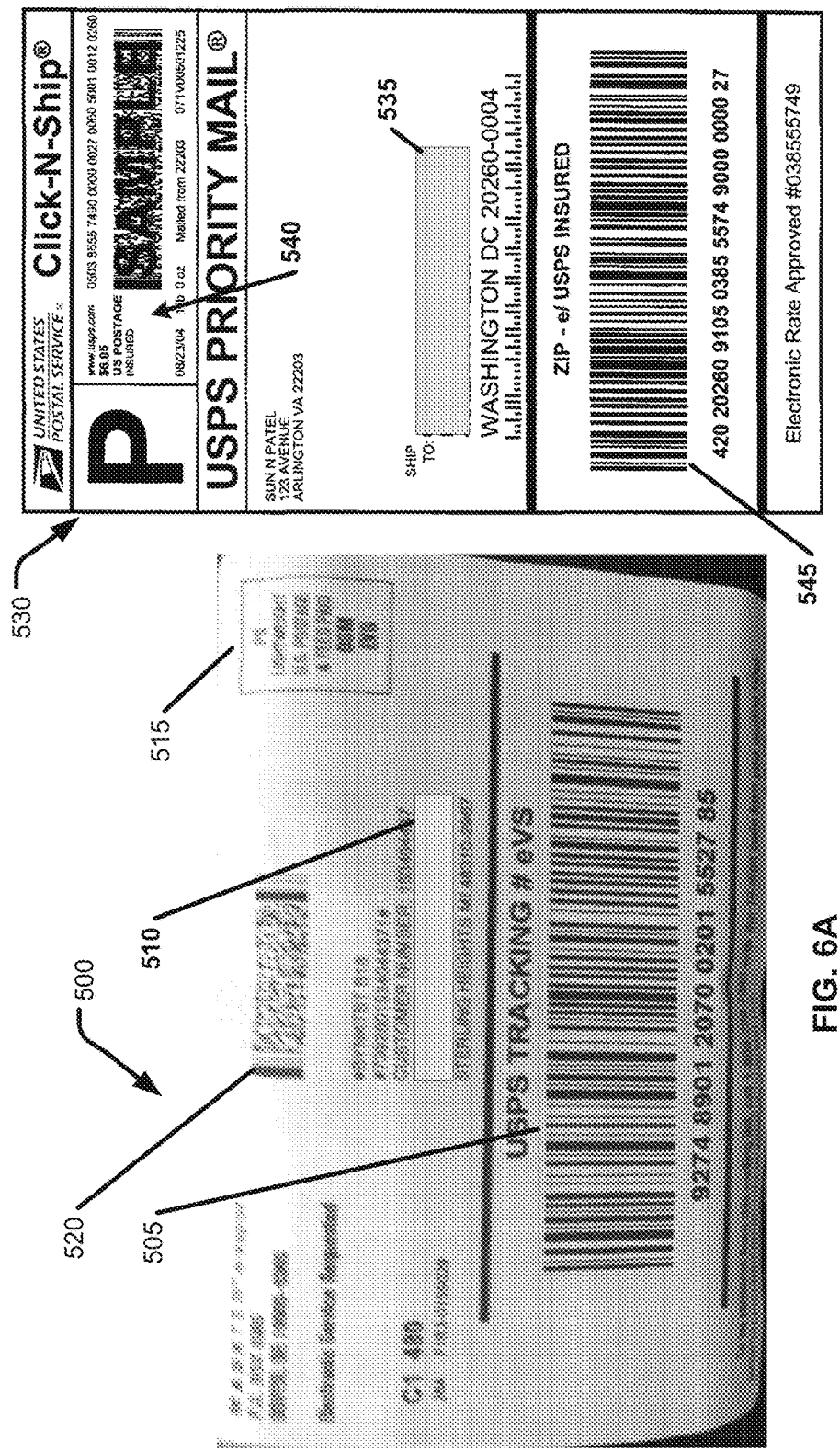
FIG. 6A is an exemplary presort shipping label.
FIG. 6B is an exemplary example of a USPS PRIORITY MAIL® shipping label.

The product sorting and labeling system 200 can be used to process parcels X in FIG. 2 that are not qualified for presort processing due to dimensions or weight of such parcels X. The non-qualifying parcels may be processed as USPS PRIORITY MAIL®. A packing slip and PRIORITY MAIL® shipping label 530, as shown in FIG. 6B with address data 535 added and postage indicium 540 affixed, may be applied by the labeler 229. Verification that the Priority Mail shipping label 530 is correct may be verified by reading the shipping barcode 545 and comparing the read date to the expected data values. Sorting is not performed so the parcels may be routed up the ramp 245 and deposited into the Gaylord, high volume, or large parcel transport container 246.

Figure 7:
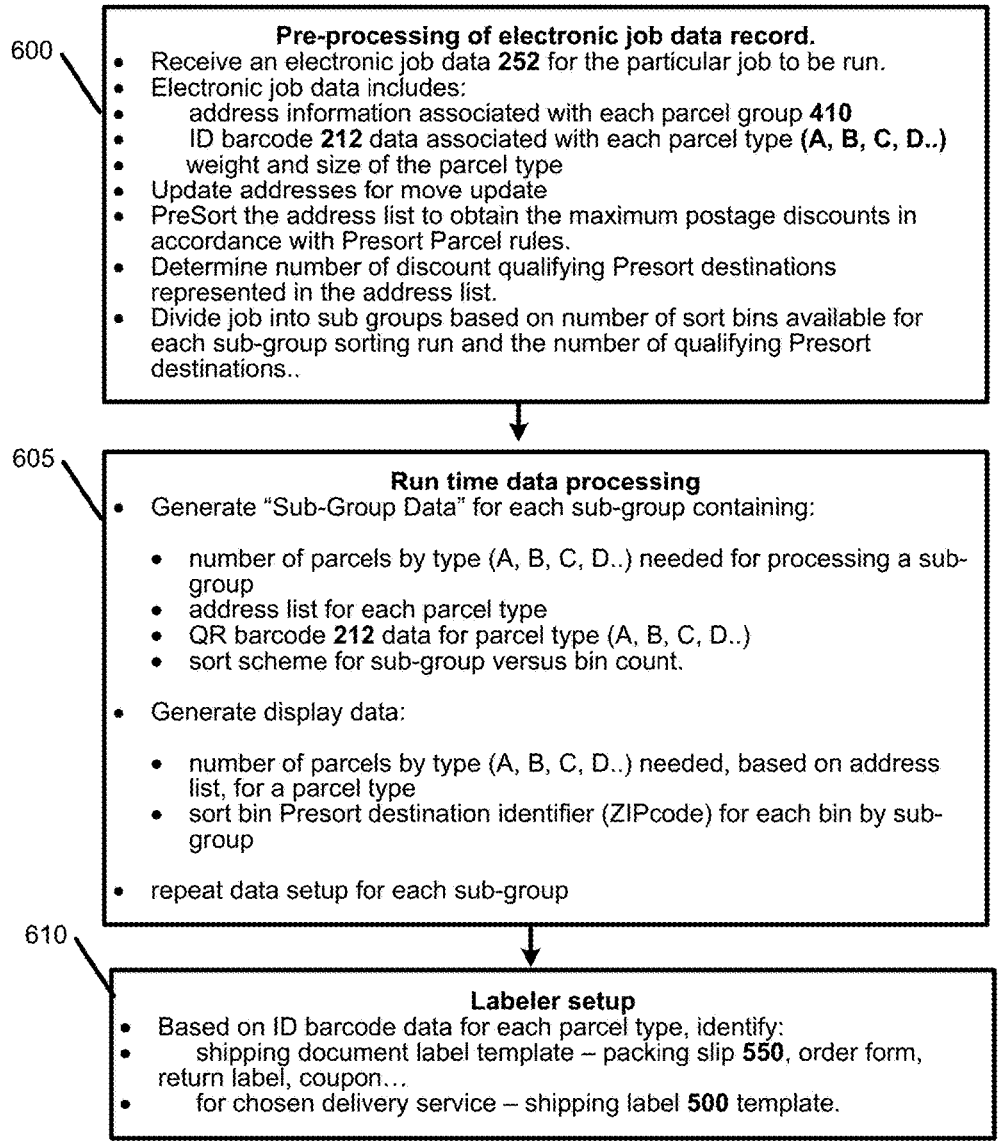
FIG. 7 is an exemplary initialization process, including steps for the sorting system.
Figure 8:
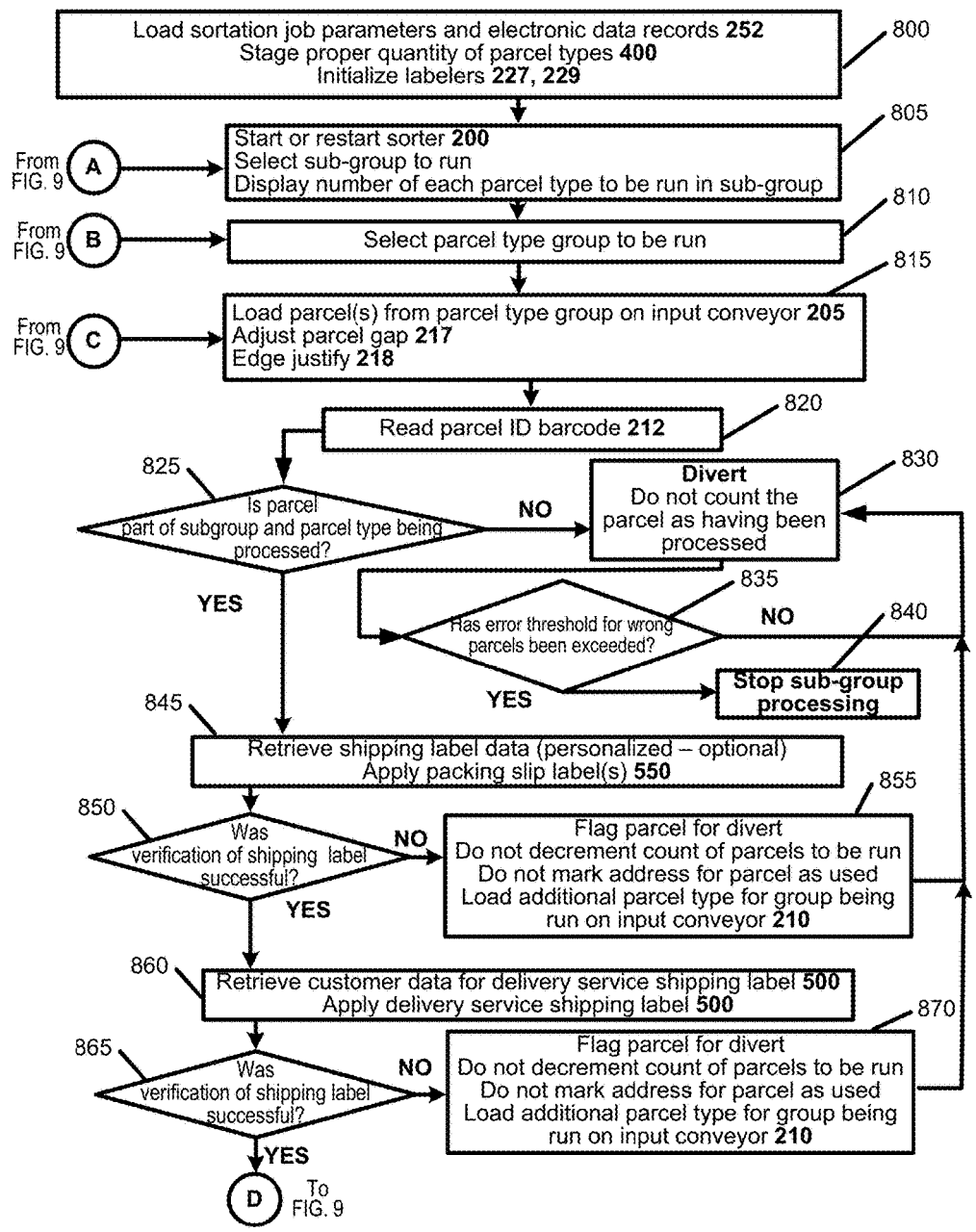
FIG. 8 is a first portion of an exemplary operational product sorter process flow diagram.
Figure 9:
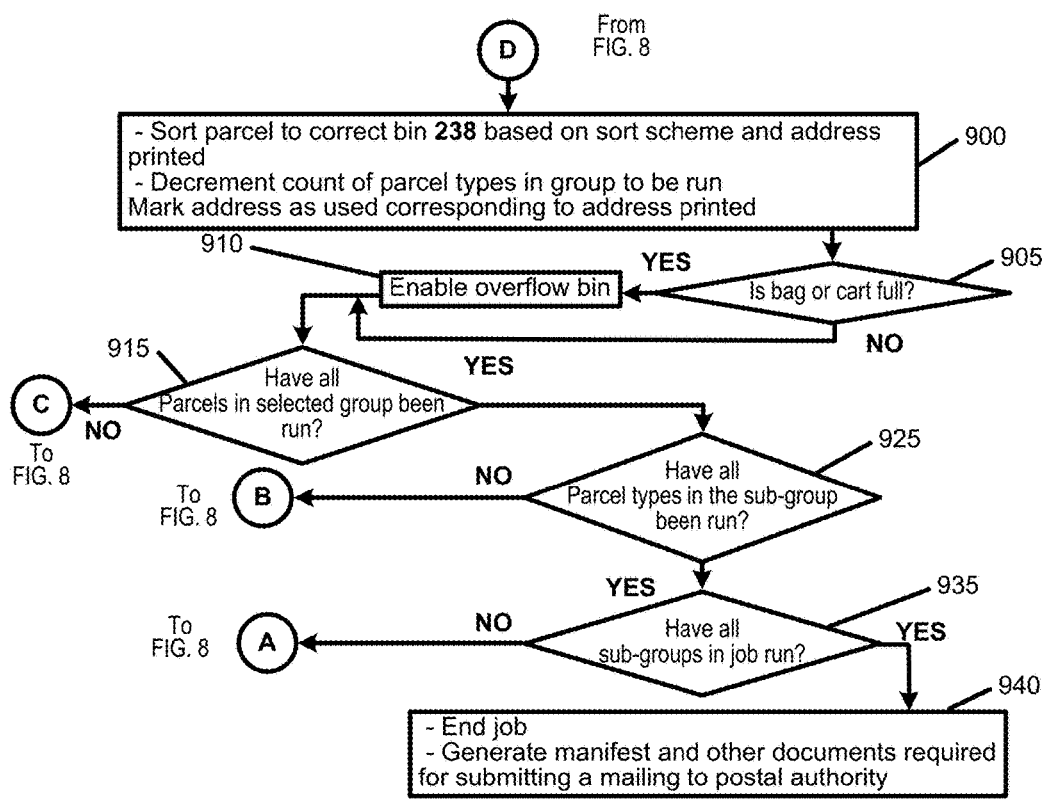
FIG. 9 is a second portion, continued from FIG. 8, of the exemplary operational product sorter process flow diagram.

Process flow diagrams FIGS. 7, 8 and 9 explain the steps involved in operation to the product sorting and labeling system 200. Data initialization is performed before a sorting job can begin as shown in FIG. 7. Step 600 defines preprocessing that may be performed on the electronic data for the job that is transferred from the enterprise server 250 to list processor server 251. A job may consist of or comprise sorting and labeling a group of unaddressed parcels in order to qualify for presort postage discounts. The job may be divided into sub-groups where each sub-group is run as an individual sort run. The-sub group runs produce accumulations of addressed parcels sorted and stacked in sort bins 238. Each sort bin 238 only contains parcels that belong to the same presort qualifying destination. Each sub-group run produces data associated with the sorting performed during the run. Both the sort bins 238 and the related data are combined to form a mailing that is provided to USPS for delivery. All of the postal delivery containers used during the job are labeled in accordance with USPS presort rules when they are removed from the product sorting and labeling system 200.

The electronic data file is stored in an address and sort scheme database 252 or other format available to the processors on the network. The electronic data includes at least the following information which is linked together: name, address, parcel type ID, parcel type dimensions, and parcel weight.

All of the names and addresses are checked for move update compliance and the data record address is replaced with the forwarding address, if required. CASS, and DPV compliance is also verified and the data record address is updated in accordance with USPS regulations. Next, the updated address list is processed using presort rules, to identify which addresses should be associated with one of the discount destination ZIP code groups (mixed NDC/AFS—auxiliary service facility (ASF) or network distribution center (NDC), area distribution center (ADC), 3 digit scheme, 3 digit, 5 digit scheme or 5 digit). To accommodate the situation where the same addressee and address are designated to receive more than one parcel type, a multiple addressee and address entry will be in the electronic data file with one entry for each parcel type. The presort postage discount rules change on a regular basis and the destination groups change monthly; these updates are integrated into the presort data processing as required. When standard class presorting is performed by the product sorting and labeling system 200 different postage discount rules apply along with destination grouping changes. Due to the limited number of sort bins 238 on the product sorting and labeling system 200, the total sorting job may be discretized into sub-groups. The qualifying presort destinations are allocated to sorting sub-groups based on the number of sort bins 238 available for each sub-group sorting run.

Job run time data processing steps are defined in step 605. The address list that is CASS, DPV, move updated, and divided into qualifying presort destinations is further subdivided into sub-group sorting jobs that make up all of the addresses for the total sorting job. The number of parcels by type (e.g., A, B, C, D, etc.) needed for processing a sub-group is determined by associating the sub-group addresses with the parcel type and parcel barcode data 212. For the example of the sub-group shown in FIG. 2, there are 4 parcel types and 4 presort destinations (1, 2, 3 and 4) that are initially assigned to primary sort bins 238 (1, 3, 5 and 7). The resulting sub-group sort scheme defines that all parcel types with an address with a 60030 ZIP code be sorted to bin 1, all parcel types with an address within a range of ZIP codes 600 to 603 be sorted to bin 3, all parcel types with an address within a range of ZIP codes 60050 to 60080 be sorted to bin 5, and all parcel types with an address with a 60020 ZIP code be sorted to bin 7. Actual efficient sort scheme generation is complex to execute. The NETSORT® software product, sold by Bell and Howell, LLC, is used to generate the required sort schemes for the product sorting and labeling system 200. Persons familiar with USPS® mail standards can get the necessary mailing standards from the USPS® Domestic Mail Manual (DMM section 200, for commercial letters, card, flats, and parcels) and from USPS® National Customer Support Center RIBBS data.

Data required for the operator run time display 257 or 258 is generated for each sub-group. The data includes the number of each parcel type (e.g., A, B, C, D, etc.) needed for the sub-group and the sort bin 238 allocation by ZIP code sort scheme criteria. The same display 257 or 258 will indicate sub-group run time status such as the number of parcel type items that have been sorted, the number of parcel-type items that are on the conveyor between input parcel sensor 206 and stacker sensor 235, and the count of sort bins 238 that have been filled. The display items listed above are but a few examples of the display data that a skilled designer may include on the run time job display. The run time data processing process is repeated for each sub-group. The allocation of tasks between steps 600 and 605 is exemplary and is not to be interpreted as being a design requirement. Both steps 600 and 605 are performed before sub-group sorting is initiated. Step 610 defines setup steps associated with the labelers 227 and 229. The parcel ID code 212 data may be used to identify the parcel type and packing slip label template. The addressee and address (customer) record may identify any additional label templates (e.g., invoice, advertisement coupon, order form, return label) required. Each label template may have both customer dependent and customer independent data. The independent data may be filled in as part of the template while customer dependent data is either filled in before the job run or as required during the sub-group job run based on the data in the electronic data record for the customer. The choice relating to when the customer dependent data is filled in and the label print files are generated is dependent on the time available for formatting the template and print file during run time. Refer to FIGS. 5 and 6A for an example of a packing slip 550 and a shipping label 500. The shipping document labeler 227 can be used to apply additional label types, such as an order form, return label or coupon. Other label formats can be added to the list as required. The additional label types may be variable (included or not) based on the customer data record.

FIG. 8 illustrates an example of the run time process flow. In step 800, the electronic data record for the sorting job to be run is retrieved from the enterprise server 250 along with job parameters associated with the job. The job parameters may include, but is not limited to, client data, postage indicia data (permit data or meter initialization data), operator 204, or mailing cutoff times. The quantity of each parcel type required for a sub-group may be staged near the input conveyor 205. The electronic data may be received by the list processor server 251 and stored in an address and sort scheme database 252. Label template data may be received for the job to be run. The parcel sorting and labeling system 200 is started for the job or restarted for a new sub-group in step 805. The sub-group to be run is selected and the operator display 258 is updated for the selected sub-group. For step 810, the operator selects a parcel type group (e.g., A) to be sorted and/or labeled. Running all parcels of a specific type at one time is efficient. However, the sorter 200 can accept running a mixed group of parcel types (e.g., A, C, and D) and sort the various parcel types into the correct bin.

The sorting operation begins with step 815. The operator starts loading parcels 210 and 211 from a group on the input conveyor 205. The parcels 210 and 211 advance past the parcel detect sensor 206 and onto the first of the gap control conveyors 217. Parcel tracking may be initiated with the sensor 206 detection and may continue, using other photo sensors distributed along the conveyor path as well as known conveyor speeds, until the parcel 210 or 211 is sorted into the appropriate sort bin 238. Once proper gap is obtained using the gap control conveyors 217, the parcel 210 or 211 is right justified by the edge justifier 218. The parcel ID code 212 is read in step 820. In step 825, determination is made by the data processor software if the parcel is included in the sub-group being run and if any more of the detected parcels needs to be labeled and sorted. If the parcel type is not needed for the current sub-group sorting run, it is diverted to the divert bin 239 in step 830. A threshold may be set for the number of parcels that can be diverted before corrective action is required. Some of the common errors that can cause diverts are operator error, display parcel count error or parcel ID code 212 labeling error. When the divert threshold is reached at step 835, the sub-group sorting is stopped and corrective action is taken, at step 840. If the divert threshold is not reached, processing returns to step 815.

As illustrated in step 845, if the parcel 210 or 211 is part of the sub-group, the shipping label data is retrieved from the address and sort scheme database 252, in either print file format or as a template plus the data needed to populate the variable fields. The label is printed, cut, and applied to the parcel 210 or 211 by the labeler 227. Multiple labels may be applied by labeler 227. For the current example, the packing slip label 550 is applied last and its contents are verified by a verifier 232 at step 850. The verifier 232 may be a barcode reader, like the SICK CLV650, or an OCR reader. If the label verification at step 850 fails, the parcel 210 or 211 is flagged in the tracking system for diversion into the divert bin 239 at step 855. The count of parcels sorted is not incremented and the name and address is not marked as used. The operator 204 is alerted to load an additional parcel of the type diverted onto the input conveyor 205 and control is transferred to step 815.

If the packing slip 550 is verified, the label data for the shipping label 500 is retrieved from the address and sort scheme database 252 in either print file format or as a template plus the data needed to populate the variable fields, which includes at least the customer name and address. The shipping label 500 is printed, cut and applied to the parcel by the liner-less labeler 229 at step 860. The shipping label 500 is applied and its contents are verified by a shipping label verifier 234 at step 865. The shipping label verifier 234 may be a barcode reader, like the SICK CLV650, or an OCR reader. If the label verification, step 865, fails, the parcel 210 or 211 is flagged in the tracking system for diversion into the divert bin 239, step 870. The count of parcels sorted is not incremented and the name and address is not marked as used. The operator 204 is alerted to load an additional parcel of the type diverted onto the input conveyor 205 and control is transferred to step 815. If the verification was successful, step 865, control is transferred to step 900, shown in FIG. 9 through connector D.

Referring to step 900 in FIG. 9, the parcel is sorted to the correct sort bin 238 based on the sort scheme and bin overflow sensor 240 status. The display count for the parcel type sorted is incremented and the name and address data record is marked as used. In step 905, the bin overflow status is checked to determine if this last parcel triggered the overflow sensor 240 of the primary assigned sort bin for the assigned destination. If yes, the corresponding overflow bin is enabled to receive parcels for the delivery destination of the primary bin at step 910. The primary and overflow bins are toggled between as dictated by the overflow sensor status. If the overflow sensor 240 of the primary sort bin was not triggered, the primary sort bin remains active. If the sub-group sorting is being done one parcel type at a time until all parcels of that parcel type are sorted, step 915 checks to see if all of the parcels in the parcel type group have been processed. If all parcels have not been processed, control is transferred to step 815, in FIG. 8 through connector C. If all parcels in the parcel type group have been processed, a check is made to determine if there are other parcel type groups to be run at step 925. If all of the parcel type groups have not been processed, control is transferred step 810, FIG. 8 through connector B, to select the next parcel type group. If all parcel types in a sub-group have been processed, a check is made in step 935 to determine if all sub-groups in the job have been processed. If all of the sub-groups have not been processed, control is transferred step 805 in FIG. 8 through connector A, to select the next sub-group to process. If no more sub-groups are to be processed, the job is complete. Manifest reports and other mailing documentation required for the submission of the sorted parcels as a mailing for delivery are generated, step 940. All of the sort bins 238 used during the job are labeled in accordance with LISPS® presort rules when the sort bins 238 are removed from the product sorting and labeling system 200.

As shown by the above discussion, functions relating to the operation of the parcel sorting and labeling system 200 are implemented in the hardware and controlled by one or more computers. The enterprise server 250 and list processor server 251 are implemented with a server architecture and the move update computer 254 and SCS computer 256 are implemented with a personal computer architecture. All of the computers are connected to the parcel sorting and labeling system 200 and are connected to each other via a network. The exemplary network interfaces 258 are shown in FIG. 1. Discrete interfaces are also used, such as USB or TTL, for communication to the parcel sorting and labeling system 200. Although special purpose devices may be used, such devices also may be implemented using one or more hardware platforms intended to represent a general class of data processing device commonly used to run "server" programming so as to implement the functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data. The software code is executable by the general-purpose computer that functions as the control processor and/or the associated terminal device. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for tracking of mail items through a postal authority network with reference to a specific mail target, in essentially the manner performed in the implementations discussed and illustrated herein.

FIGS. 10 and 11 provide functional block diagram illustrations of general purpose computer hardware platforms. FIG. 10 illustrates a network or host computer platform, as may typically be used to implement a server. FIG. 11 depicts a computer with user interface elements, as may be used to implement a personal computer or other type of work station or terminal device, although the computer of FIG. 11 may also act as a server if appropriately programmed. Those skilled in the art ought to be familiar with the structure, programming, and general operation of such computer equipment, therefore the drawings ought to be self-explanatory.

For example, control processor may be a PC based implementation of a central control processing system like that of FIG. 11, or may be implemented on a platform configured as a central or host computer or server like that of FIG. 10. Such a system typically contains a central processing unit (CPU), memories, and an interconnect bus. The CPU may contain a single microprocessor (e.g. a Pentium microprocessor), or it may contain a plurality of microprocessors for configuring the CPU as a multi-processor system. The memories include a main memory, such as a dynamic random access memory (DRAM) and cache, as well as a read only memory, such as a PROM, an EPROM, a FLASH-EPROM, or the like. The system memories may also include one or more mass storage devices such as various disk drives, tape drives, etc.

In operation, the main memory stores at least portions of instructions for execution by the CPU and data for processing according to the executed instructions, for example, as uploaded from a mass storage system. The mass storage system may include one or more magnetic disk or tape drives or optical disk drives for storing data and instructions for use by the CPU. For example, at least one mass storage system in the form of a disk drive or tape drive stores the operating system and various application software. The mass storage system within the computer system may also include one or more drives for various portable media, such as a floppy disk, a compact disc read only memory (CD-ROM), or an integrated circuit non-volatile memory adapter (i.e. PC-MCIA adapter) to input and output data and code to and from the computer system.

The system also includes one or more input/output interfaces for communications, shown by way of example as an interface for data communications with one or more other processing systems. Although not shown, one or more such interfaces may enable communications via a network, e.g., to enable sending and receiving instructions electronically. The physical communication links may be optical, wired, or wireless.

The computer system may further include appropriate input/output ports for interconnection with a display and a keyboard serving as the respective user interface for the processor/controller. For example, a printer control computer in a document factory may include a graphics subsystem to drive the output display. The output display 257 or 258, for example, may include a cathode ray tube (CRT) display, or a liquid crystal display (LCD) or other type of display device. The input control devices for such an implementation of the system would include the keyboard for inputting alphanumeric and other key information. The input control devices for the system may further include a cursor control device (not shown), such as a mouse, a touchpad, a trackball, stylus, or cursor direction keys. The links of the peripherals to the system may be wired connections or use wireless communications.

The computer system runs a variety of applications programs and stores data, enabling one or more interactions via the user interface provided, and/or over a network to implement the desired processing, in this case, including those for tracking of mail items through a postal authority network with reference to a specific mail target, as discussed above.

The components contained in the computer system are those typically found in general purpose computer systems. Although summarized in the discussion above mainly as a PC type implementation, those skilled in the art will recognize that the class of applicable computer systems also encompasses systems used as host computers, servers, workstations, network terminals, and the like. In fact, these components are intended to represent a broad category of such computer components that are well known in the art. The present examples are not limited to any one network or computing infrastructure model—i.e., peer-to-peer, client server, distributed, etc.

Hence aspects of the techniques discussed herein encompass hardware and programmed equipment for controlling the relevant document processing as well as software programming, for controlling the relevant functions. A software or program product, which may be referred to as a "program article of manufacture" may take the form of code or executable instructions for causing a computer or other programmable equipment to perform the relevant data processing steps, where the code or instructions are carried by or otherwise embodied in a medium readable by a computer or other machine. Instructions or code for implementing such operations may be in the form of computer instruction in any form (e.g., source code, object code, interpreted code, etc.) stored in or carried by any readable medium.

Such a program article or product therefore takes the form of executable code and/or associated data that is carried on or embodied in a type of machine readable medium. "Storage" type media include any or all of the memory of the computers, processors or the like, or associated modules thereof, such as various semiconductor memories, tape drives, disk drives and the like, which may provide non-transitory storage at any time for the software programming.

All or portions of the software may at times be communicated through the Internet or various other telecommunication networks. Such communications, for example, may enable loading of the relevant software from one computer or processor into another, for example, from a management server or host computer into the image processor and comparator. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including, for example, a tangible storage medium, a carrier wave medium or physical transmission medium. Non-volatile storage media include, for example, optical or magnetic disks, such as any of the storage devices in any computer(s) or the like. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include, for example: a floppy disk, a flexible disk, hard disk, magnetic tape, any other magnetic medium, a CD-ROM, DVD or DVD-ROM, any other optical medium, punch cards, paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The invention claimed is:

1. A method for parcel one pass labeling and sorting for presort qualification, the method comprising:
    providing one or more sub-groups of parcel pieces, wherein each parcel piece of a same sub-group of the one or more sub-groups has a substantially identical contents, size, and weight, wherein each parcel piece of a same sub-group of the one or more sub-groups is devoid of delivery address data printed on an outside thereof, and wherein each parcel piece of a same sub-group of the one or more sub-groups is configured to be sorted and combined, along with parcel pieces from other sub-groups of the one or more sub-groups, to form a single mailing;
    loading each parcel piece of a sub-group of the one or more sub-groups onto a conveyor;
    presorting an address list, which comprises a certified address for each parcel piece of all of the one or more sub-groups forming the single mailing in accordance with postal standards required for discount postage rates;
    displaying, by a display unit, a group type indicator and a status indicator of a first sub-group of the one or more sub-groups to be sorted;
    applying, by a label applicator, a label containing presorted address data for the first sub-group being processed onto each parcel piece of the first sub-group;
    sorting, based on a sort scheme defined for all sub-groups that make up the mailing, the parcel pieces of the first sub-group;
    depositing the parcel pieces of the first sub-group into one of one or more sort bins; and
    repeating steps of applying labels to, sorting, and depositing parcel pieces of additional sub-groups of the one or more sub-groups in accordance with instructions on the display unit until each of the one or more sub-groups has been processed.

2. The method of claim 1, wherein applying the label onto each of the parcel pieces of the one or more sub-groups comprises printing and applying one or more addressed shipping labels on top of one or more shipping documents, the one or more shipping documents comprising an invoice, an advertisement coupon, an order form, and/or a return label.

3. The method of claim 1, wherein applying the label onto each of the parcel pieces of the one or more sub-groups comprises dynamically printing and applying one or more labels of different sizes on different parcel pieces.

4. The method of claim 1, further comprising:
    detecting, by a barcode reader, a parcel identification (ID) barcode disposed on each parcel piece in the one or more sub-groups of parcel pieces; and
    verifying a correct parcel is being sorted.

5. The method of claim 1, further comprising:
    transporting the parcel pieces of the one or more sub-groups along a direction of travel on the conveyor;
    ensuring sufficient spacing between each parcel piece of the one or more sub-groups using one or more gap control conveyors; and
    justifying each parcel piece of the one or more sub-groups to one side of the conveyor using one or more edge justifiers.

6. The method of claim 1, further comprising identifying one or more presort destinations to sort the parcel pieces of the one or more sub-groups.

7. The method of claim 6, wherein the at least one presort destination comprises NDC/AFS, ADC, a three digit scheme, three digits, a five digit scheme, five digits, and/or any combination thereof.

8. The method of claim 1, comprising removing a respective sort bin associated with a presort destination after all parcel pieces designating the presort destination for any of the plurality of sub-groups have been processed, but before all parcel pieces of all of the plurality of sub-groups have been processed.

9. A method for dynamic bin allocation in a one pass labeling and sorting system, the method comprising:
    providing one or more sub-groups of parcel pieces, wherein each parcel piece of a same sub-group of the one or more sub-groups has a substantially identical contents, size, and weight, wherein each parcel piece of a same sub-group of the one or more sub-groups is devoid of delivery address data printed on an outside thereof, and wherein each parcel piece of a same sub-group of the one or more sub-groups is configured to be sorted and combined, along with parcel pieces from other sub-groups of the one or more sub-groups, to form a single mailing;

presorting an address list, which comprises a certified address for each parcel piece of all of the one or more sub-groups forming the single mailing, in accordance with postal standards required for discount postage rates;

providing a one pass labeling and sorting system comprising:
- a conveyor;
- a display unit configured to display a group type indicator and a status indicator of the one or more sub-groups to be sorted;
- label applicator configured to apply one or more labels containing pre-sorted address data onto the parcel pieces of the one or more sub-groups; and
- a sort scheme defined for all sub-groups that make up the mailing, wherein the parcel pieces of each of the one or more sub-groups are sorted and deposited into a corresponding sort bin of the one or more sort bins according to the sort scheme,
- wherein the one pass labeling and sorting system is configured to repeating steps of applying labels to, sorting, and depositing parcel pieces of additional sub-groups of the one or more sub-groups in accordance with instructions on the display unit until each of the one or more sub-groups has been processed; and dynamically allocating, based on the sort scheme, the parcel pieces of the one or more sub-groups to at least one of the one or more sort bins.

10. The method of claim 9, wherein dynamically allocating the parcel pieces of the one or more sub-groups to at least one of the one or more sort bins comprises using a dynamic control based on a number of the one or more sort bins and/or a number of overflow sort bins.

11. The method of claim 9, wherein a single sub-group of the one or more sub-groups is used for dynamically allocating the parcel pieces.

12. The method of claim 9, further comprising assigning at least one sort bin of the one or more sort bins to at least one presort destination and sorting the parcel pieces of the one of the one or more sub-groups having a same presort destination as the at least one sort bin into the at least one sort bin assigned to the at least one presort destination.

13. The method of claim 12, wherein the at least one presort destination comprises NDC/AFS, ADC, a three digit scheme, three digits, a five digit scheme, five digits, and/or any combination thereof.

14. The method of claim 12, wherein dynamically allocating the parcel pieces of one of the one or more sub-groups to the at least one sort bin comprises assigning primary and secondary sort bins of the one or more sort bins to the at least one presort destination group, the method further comprising switching between the primary and secondary sort bins after detecting that the primary or the secondary bin is filled.

15. The method of claim 12, wherein the at least one presort destination comprises a plurality of presort destinations, and wherein dynamically allocating the parcel pieces of the one or more sub-groups to at least one of the one or more sort bins comprises dynamically allocating sort bins to a new presort destination of the plurality of presort destinations based on the sort scheme and which of the plurality of presort destinations have been processed and which of the plurality of presort destinations have not been processed.

16. The method of claim 9, comprising removing a respective sort bin associated with a presort destination after all parcel pieces designating the presort destination for any of the plurality of sub-groups have been processed, but before all parcel pieces of all of the plurality of sub-groups have been processed.

* * * * *